L. E. SHAW.
WHEEL MOUNTING FOR LIGHT MOTOR VEHICLES.
APPLICATION FILED JUNE 24, 1921.

1,426,417.

Patented Aug. 22, 1922.
2 SHEETS—SHEET 1.

WITNESSES

INVENTOR
Louis E. Shaw
BY
ATTORNEYS

L. E. SHAW.
WHEEL MOUNTING FOR LIGHT MOTOR VEHICLES.
APPLICATION FILED JUNE 24, 1921.

1,426,417.

Patented Aug. 22, 1922.
2 SHEETS—SHEET 2.

WITNESSES

INVENTOR
Louis E. Shaw
BY
Knight Bros
ATTORNEYS

UNITED STATES PATENT OFFICE.

LOUIS E. SHAW, OF EAST ORANGE, NEW JERSEY, ASSIGNOR TO WILLIAMS MOTORS INC., OF NEW YORK, N. Y., A CORPORATION OF DELAWARE.

WHEEL MOUNTING FOR LIGHT MOTOR VEHICLES.

1,426,417.  Specification of Letters Patent.  Patented Aug. 22, 1922.

Application filed June 24, 1921. Serial No. 480,131.

*To all whom it may concern:*

Be it known that I, LOUIS E. SHAW, a citizen of the United States, and residing at East Orange, county of Essex, State of New Jersey, have invented certain new and useful Improvements in Wheel Mountings for Light Motor Vehicles, of which the following is a complete specification, the particular novel features being more fully pointed out in the annexed claims.

My invention relates to the mounting of light motor vehicle wheels in which the wheel is held on the vehicle frame within a fork and where it becomes necessary when changing a tire, to disconnect some portions of the wheel support from the vehicle frame in order to take out the tire.

A suitable wheel mounting for this purpose is of particular importance in the case of wheels which have a rotary cylinder motor mounted within the wheel, such as is shown for instance in the U. S. patent to J. Newton Williams, No. 1,139,616 of May 18th, 1915, on which the present invention is a particular improvement. Of course it is understood that my improvement is not confined specifically to this type of motor vehicles but may be applied also to vehicle wheels of similar character which do not have the motor disposed inside of the wheel.

In motor vehicles of the type illustrated in the aforementioned patent it is essential that, when disconnecting the wheel, containing the motor, from its frame, in order to remove or attach a tire, that the motor and the adjoining portions of the driving mechanism remain undisturbed by the operation of tire removal. For this reason I propose to construct the vehicle wheel as a unit, entirely by itself, and to mount it on the vehicle frame in such manner that it may be disconnected therefrom sufficiently to permit the removal or attaching of a tire without disturbing the driving mechanism in any way.

My invention is illustrated in the accompanying drawings in which—

Figure 1:
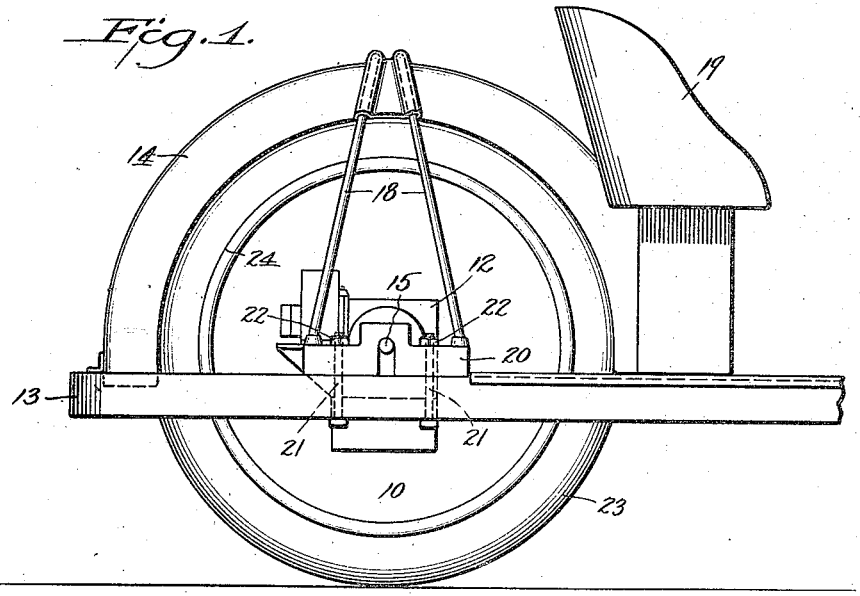
Figure 2:
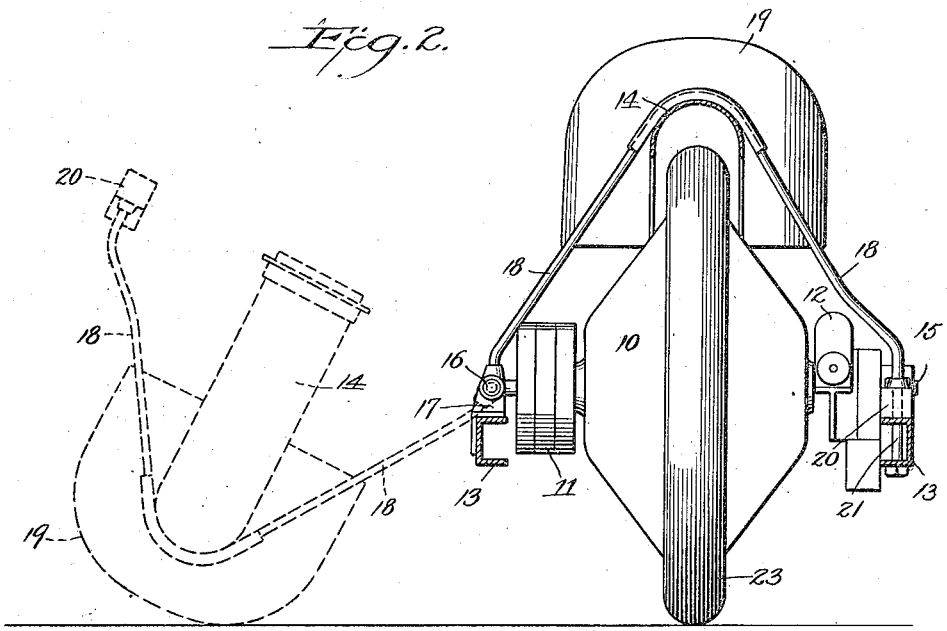
Figure 3:
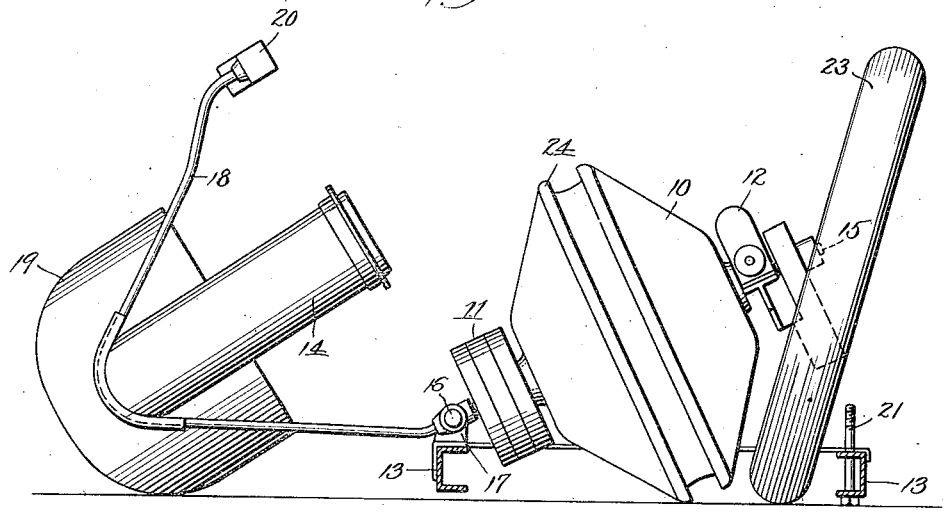
Figure 4:
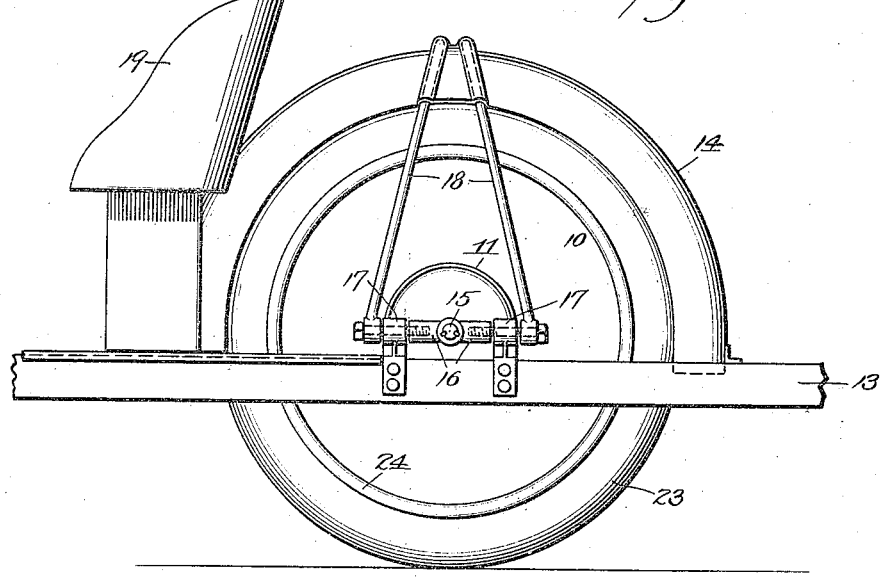

Fig. 1 represents a side elevation of the rear wheel of the vehicle containing the motor, Fig. 2 represents a rear view of the vehicle wheel, showing the fork in detached position in dotted lines, Fig. 3 represents the same view showing the fork detached and the vehicle frame dropped so that the tire may be taken out of the frame, and Fig. 4 represents a side elevation of the wheel seen from the opposite side from which it is shown in Fig. 1.

Referring to Figs. 1 and 2, 10 is the vehicle wheel containing the motor and having attached to it as a unit the gear drive 11 and the magneto 12. This entire wheel unit is attached to the top of the vehicle frame 13 and covered by the mud guard 14 which is mounted together with the wheel on the frame 13 in the following manner:

Referring to Fig. 4, it will be noted that the stationary crank shaft 15 of the rotary cylinder motor is fixed in an axle 16, pivotally disposed on two lugs 17 fixed to frame 13, such that the whole wheel can swing on that frame portion on axle 16. On this axle 16 are pivotally mounted the two rods 18 which constitute the fork (see Fig. 2) which fork holds the mud guard 14 with which also the driver's seat 19 is rigidly connected as shown in Figs. 1 and 4. Thus it becomes possible as shown in dotted lines in Fig. 2 to swing the fork 18, 18 together with the mud guard 14 and seat 19 away from the top of the wheel so that the latter becomes entirely exposed.

In Fig. 1 is shown the manner in which the free ends of the fork 18, 18 are mounted on the vehicle frame. These ends of fork 18 are attached to a common block 20, the center of which block rests on the free end of the stationary crank shaft 15 of the vehicle wheel unit 10, which shaft for this purpose protrudes a sufficient length on that side. Block 20 is fastened to vehicle frame 13 by means of two bolts 21 which are easily removable by loosening the two nuts 22 from the top of the block 20. As soon as these bolts are loosened the fork with the mud guard and seat may be swung over in the dotted position shown in Fig. 2, the rear end of the vehicle 13 being supported by a jack, (not shown) by which the frame is sufficiently lifted to clear the wheel 10 off the ground. This gives the operator free access to the wheel when removing the tire 23 from the rim.

After the tire has been detached from the wheel 10, the jack is removed from frame 13, and the latter is dropped to the ground, as shown in Fig. 3 whereby the vehicle frame pivots on the front axle of the vehicle (not shown). When this occurs wheel 10 will strike the ground with its rim 24 and thereby tilt on axle 16 into a position shown in Fig. 3, in which the opposite end of the wheel crank shaft 15 is lifted off the vehicle frame 13 sufficiently to allow the tire 23 to be removed out of the frame. After the new tire is inserted, the frame 13 is first lifted (which in this class of light vehicles may easily be done by hand) and then again supported by a jack so as to enable the operator to remount the tire on the rim. Then the operator swings fork 18 together with the mud guard 14 and seat 19 over the wheel and attaches the free end of the fork to the frame 13 by means of bolts 21. The jack may now be removed from the frame and the vehicle may now rest again on the rear wheel.

I claim:—

1. In a motor vehicle of the character described the combination of a vehicle wheel and its axle, with a vehicle frame surrounding said wheel and being suspended from said axle, one end of said axle being pivotally attached to one side of said frame, and means for removably attaching the other, free, end of said axle to the other side of said frame to permit the insertion of a wheel tire between the free axle end and the frame when said axle end is detached and elevated from the frame.

2. In a motor vehicle of the character described, the combination of a vehicle wheel and its axle and of a mud guard for said wheel, with a vehicle frame surrounding said wheel and being suspended from said axle, one end of said axle and one side of the said mud guard being pivotally attached to one side of said frame, and means for removably attaching the other, free, end of said axle and the other side of said guard to the other side of said frame, to permit the insertion of a wheel tire between the free axle end and the frame when said axle and the corresponding side of said guard are detached and elevated from said frame.

LOUIS E. SHAW.